United States Patent [19]

Yada

[11] Patent Number: 5,171,051
[45] Date of Patent: Dec. 15, 1992

[54] FASTENER FOR MOUNTING STRIP-LIKE MEMBER TO AUTOMOBILE BODY

[75] Inventor: Yukihiko Yada, Nagoya, Japan

[73] Assignee: Tokai Kogyo Kabushiki Kaisha, Ohbu, Japan

[21] Appl. No.: 788,419

[22] Filed: Nov. 6, 1991

[30] Foreign Application Priority Data

Nov. 6, 1990 [JP] Japan .................................. 2-300425

[51] Int. Cl.[5] .............................................. B60R 13/06
[52] U.S. Cl. ........................................ 296/93; 52/208
[58] Field of Search ................... 296/93, 201, 84.1; 52/208, 400

[56] References Cited

U.S. PATENT DOCUMENTS 4,950,019  8/1990  Gross ..................................... 296/93
4,984,839  1/1991  Miyakawa et al. .................... 296/93

FOREIGN PATENT DOCUMENTS 282116  12/1986  Japan ................................... 296/983
231814  10/1987  Japan .................................... 296/93
2219338 12/1989  United Kingdom ................. 296/93

Primary Examiner—Robert R. Song
Attorney, Agent, or Firm—Oblon, Spivak, McClelland, Maier & Neustadt

[57] ABSTRACT

A fastener for mounting a strip-like member to an automobile comprises an upper member and a lower member. The upper member serves to seal a space between a window opening of the vehicle body panels and a windshield. At a side fastener part, the upper member extends laterally to define a space for a water drain channel. The lower member supports a windshield molding to be mounted in the window opening to hold the windshield. The fastener is extruded in the strip shape.

3 Claims, 5 Drawing Sheets

FASTENER FOR MOUNTING STRIP-LIKE MEMBER TO AUTOMOBILE BODY

BACKGROUND OF THE INVENTION

1. Field of the Invention:

This invention relates to a fastener for mounting a strip-like member such as a windshield molding to body panels of an automobile.

2. Description of the Related Art

A variety of extruded strip-like articles such as a windshield molding are installed in an automobile. To install such strip-like member (hereinafter called "molding"), firstly a fastener in the strip shape is attached to a vehicle body panel, and secondly the molding is coupled to the fastener, so that the molding is attached to the vehicle body panel via the fastener.

Such fasteners are disclosed in Japanese Patent Laid-Open Publications 282116/1986 and 27723/1986, and Japanese Utility Model Laid-Open Publications 182914/1988, 182915/1988 and 44818/1989.

With these citations, firstly a base of a fastener is attached to a reference surface of a vehicle body panel. Secondly, part of a molding is fitted into the fastener, so that the molding is attached to the vehicle body panel via the fastener. A space between a window opening of the vehicle body panel and the molding is sealed by lip-shaped members of the fastener and molding.

Japanese Utility Model Laid-Open Publications 2613/1989 and 14513/1989 disclose windshield moldings, in which a water drain channel is defined along a side molding part in a space formed according to the difference of height between the vehicle body panel and an upper surface of the windshield.

With the foregoing conventional windshield moldings, the water drain channel is uniformly and longitudinally formed only by using the space between the windshield molding and the upper surface of the windshield. Therefore, the water drain channel is not deep enough to function as a dam and cannot be adjusted its cross-sectional area appropriately.

The molding and fastener are usually manufactured by the extrusion molding process, having uniform cross-sectional shapes through their whole length. The water drain channel is usually formed only along the side edges of the windshield. Therefore, the cross-sectional shapes of the molding and fastener should be changed according to the side edges of the windshield. For this purpose, it is conventional that a molding and a fastener for the upper edge of the windshield, and molding and fasteners for the side edges of the windshield are separately molded, and these moldings and fasteners are then coupled by joints. A number of processes and component parts are required to manufacture the molding and fasteners as described above. Further, the moldings and fasteners will be sometimes damaged when they are coupled by joints, or the coupled portions may generate noises, deteriorating their external appearances.

SUMMARY OF THE INVENTION

It is a first object of this invention to provide a fastener which can form a water drain channel together with a windshield molding.

Another object of this invention is to provide a fastener comprising a pair of extruded side fastener parts and an extruded upper fastener part integral with and extending between the side fastener parts.

According to a first aspect of this invention, there is provided an extruded fastener strip for mounting a strip-like member to body panels of a motor vehicle, comprising: an upper member for sealing a space between the strip-like article and the body panel of the motor vehicle; a lower member extending downwardly from the upper member, the lower member being folded at an end thereof to define a space for receiving the strip-like member therein; and a peak extending laterally over the strip-like member from the upper member. The lower member has a gradually increased height according to a position of the body panel.

According to a second aspect of this invention, there is provided an extruded fastener strip for mounting a windshield molding in a window opening of a vehicle body panel and a windshield, comprising a pair of side fastener parts and an upper fastener part integral with and extending between the side fastener parts, each of the upper fastener part and the side fastener parts including: an upper member for sealing a space between the windshield molding and the body panel of the motor vehicle; and a lower member extending downwardly from the upper member, the lower member being folded at an end thereof to define a space for receiving the windshield molding therein. At the side faster part the lower member has a gradually increased height, and the upper member has a peak extending laterally therefrom to define a space for a water drain channel.

At each side fastener part, the upper member of the fastener extends laterally to serve as a peak, under which a space is defined by the lower member of the fastener and a mating windshield molding. This space is used as a water drain channel to guide fluid such as rain water to a specified direction to prevent the fluid from being sprayed over side windows.

The space for the water drain channel is enlarged as the upper and lower members of the fastener are increased in height and width according to a varying difference of height between a vehicle body panel and an upper surface of the windshield. Therefore, the water drain channel will be wide and deep enough to guide the fluid.

The fastener is extruded in the shape of strip, including a pair of side fastener parts and an upper fastener part integral with and extending between the side fastener parts.

DETAILED DESCRIPTION

Figure 4:
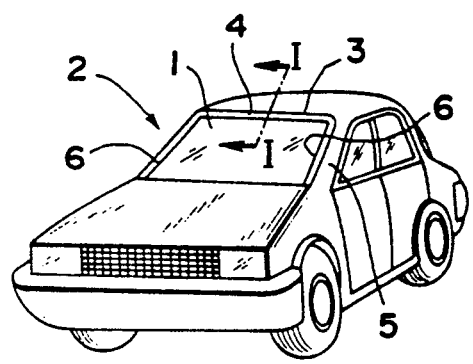
FIG. 4 is a perspective view of a front part of a motor vehicle to install the fastener.

As shown in FIG. 4, a motor vehicle has a windshield 1, of which peripheral edge is fastened to body panels via a windshield molding 2 (hereinafter called "molding 2") and a non-illustrated fastener.

The molding 2 comprises a pair of extruded side molding parts 6 and an extruded upper molding part 4 integral with and extending between the side molding parts 6. The upper molding part 4 is mounted between the upper edge of the windshield 1 and a roof panel 3, and the side molding parts 6 are mounted between the pillar panels 5 and side edges of the windshield 1. These molding parts 4, 6 are extruded in the strip shape.

The fastener comprises a pair of extruded side fastener parts and an extruded upper fastener part integral with and extending between the side fastener parts similar to the molding 2. Each fastener part includes an upper member and a lower member extending downwardly from the upper member.

Figure 1:
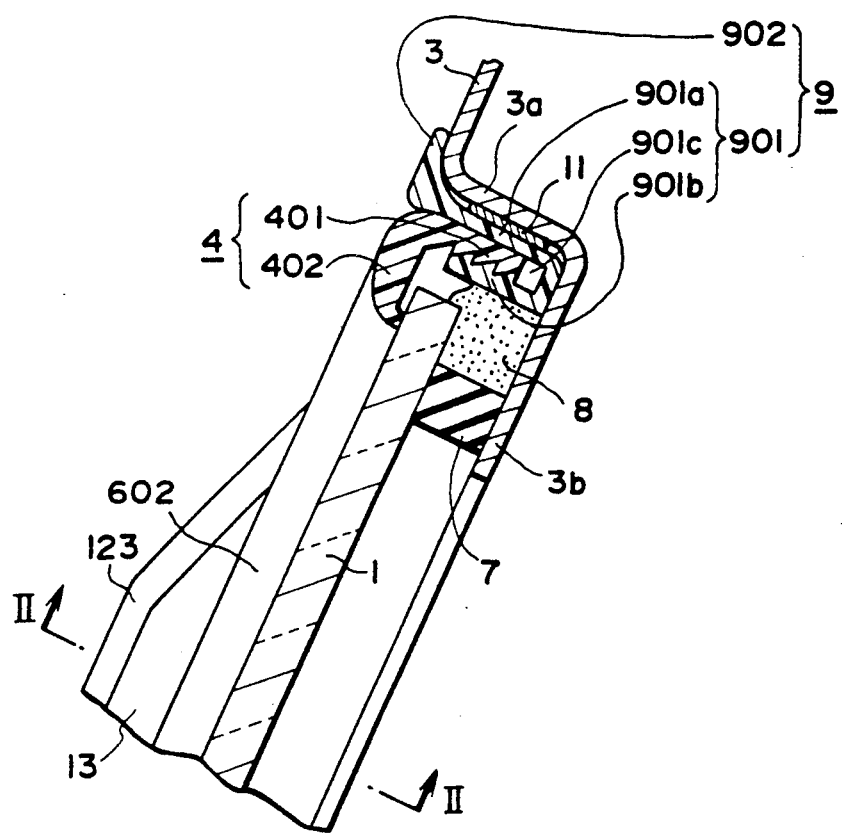
FIG. 1 is a cross-sectional view of a fastener according to a first embodiment of this invention, taken along line I—I of FIG. 4.
Figure 2:
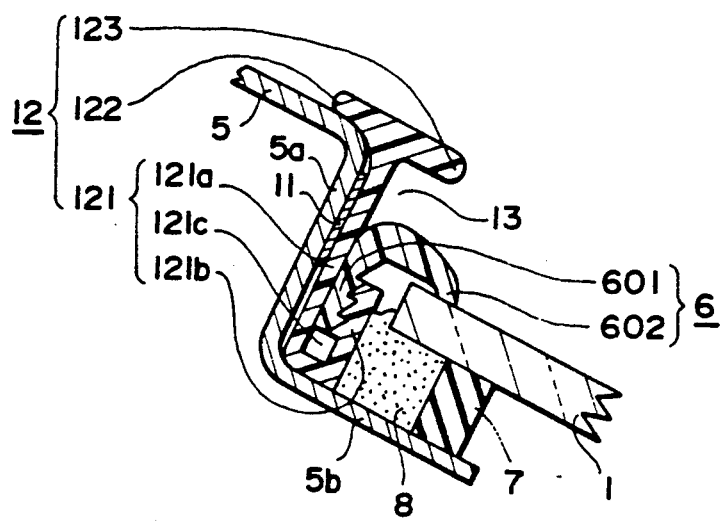
FIG. 2 is a cross-sectional view of the fastener taken along line II—II of FIG. 1.
Figure 3:
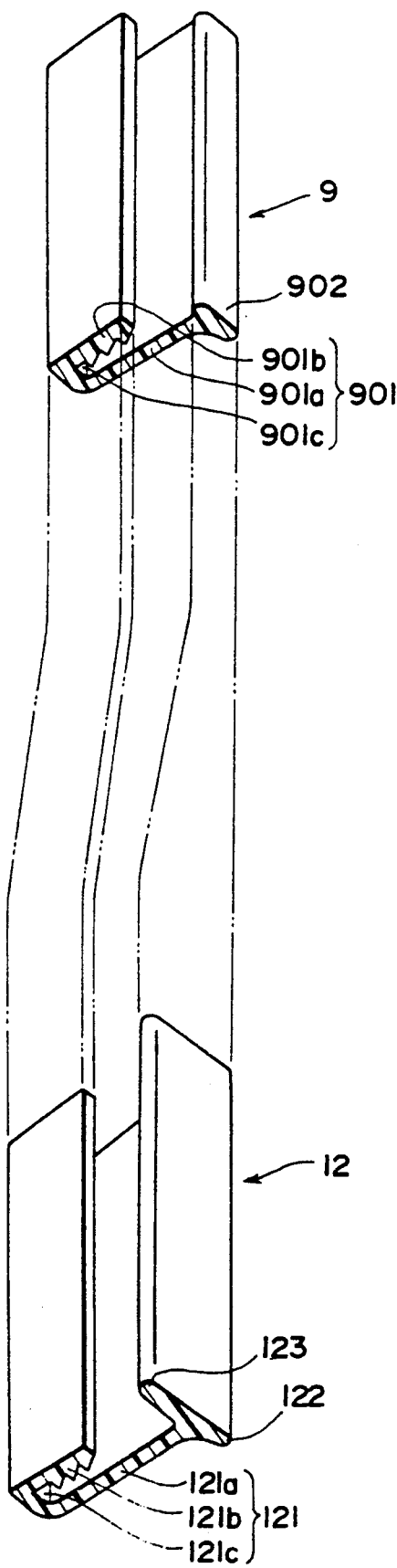
FIG. 3 is a perspective view of the fastener.

FIGS. 1 to 3 show a fastener according to a first embodiment of this invention, together with the molding 2.

As shown in FIG. 1, a peripheral edge of the roof panel 3 is folded to form an intermediate wall 3a, and a flange 3b extending toward the windshield 1. The upper fastener part 9 is inserted in a space defined by the intermediate wall 3a, flange 3b and the windshield 1. The windshield 1 is placed to overlap on the flange 3b with a space defined between an upper edge thereof and the upper fastener part 9. A dam rubber 7 is inserted between the windshield 1 and the flange 3b. The upper molding part 4 is received in a space defined by the upper fastener part 9 and the upper edge of the windshield 1. An adhesive 8 is filled between the upper fastener part 9, windshield 1, dam rubber 7 and flange 3b to fasten these members.

The upper fastener part 9 mates with the upper molding part 4. Structures of these fastener and molding arts 9, 4 will be described hereinafter.

As shown in FIGS. 1 and 3, the upper fastener part 9 includes an upper member 902 and a lower member 901. The lower member 901 is in the shape of U, having a wall 901a and a bend 901b which extends from and in parallel with the wall 901a upwardly toward the edge of the windshield 1. The lower member 901 is mounted on the flange 3b as a reference position, being in contact with the intermediate wall 3a of the roof panel 3. The lower member 901 receives the upper molding part 4 in the central hollow portion thereof. The bend 901b has a ribbed surface facing the wall 901a.

The upper fastener part 9 is attached to the intermediate wall 3a of the roof panel 3 via a double adhesive tape 11. A space 901c is defined between the wall 901a and the ribbed surface of the bend 901b. The upper molding part 4 is received in the space 901c, being engaged with the ribbed surface (i.e. three ribs are formed) of the bend 901b, which will be described later.

The upper member 902 of the upper fastener part 9 is in the shape of lip, being bent according to the radius of the roof panel 3, and being in close contact with the roof panel 3 to seal the space between the roof panel and the windshield 1.

Similarly to the fastener, the molding 2 comprises a pair of extruded side molding parts and an extruded upper molding part integral with and extending between the side molding parts. Each molding part includes a decorative member and a leg extending from the decorative member.

The upper molding part 4 has a decorative member 402 and a leg 401 extending from the decorative member 402. The decorative member 402 is in the shape of lip, being in flexible and pressure contact with the upper peripheral surface of the windshield 1 to seal the space between the windshield 1 and the roof panel 3 together with the upper fastener part 9.

The leg 401 has a ribbed side to be engaged with the ribbed surface of the bend 901b of the lower member of the upper fastener part 9. Thus, the upper molding part 4 is firmly engaged with the upper fastener part 9 by the leg 401 fitted in the space 901c.

FIG. 2 shows cross-sectional shapes of a side fastener part and a side molding part. The side fastener and molding parts are related to each other essentially similarly to the upper fastener and molding parts shown in FIG. 1. The molding has the same structure throughout the upper and side molding parts. The structure of the fastener is essentially the same throughout the upper and side fastener parts, but the side fastener part differs from the upper fastener part in the height of the lower member and shape of the upper member.

A pillar panel 5 is folded similarly to the roof panel 3, including an intermediate wall 5a and a flange 5b. A side fastener part 12 is attached along the pillar panel 5. A side edge of the windshield 1 confronts the side fastener part 12 with a space between them. The windshiled 1 is positioned on the flange 5b via the dam rubber 7. The adhesive 8 is filled in the space between the lower member 121b, flange 5b, dam rubber 7 and windshield 1 to fasten these members.

A side molding part 6 is attached to the side fastener part 12.

As shown in FIGS. 2 and 3, the lower member 121 is U-shaped, having a wall 121b and a bend 121b which extends upwardly from the wall 121a. The lower member 121 is in contact with the intermediate wall 5a and flange 5b of the pillar panel 5, supporting part of the side molding part 6. The bend 121b has a ribbed surface on the side confronting the wall 121a.

A space 121c is formed between the wall 121a and the bend 121b of the lower member 121. The side molding part 6 is received in the space 121c as described with reference to the upper molding part 4.

The lower member 121, i.e. wall 121a, extends upwardly along the intermediate wall 5a of the pillar panel 5 since there is a varying difference of height between the pillar panel 5 and the upper surface of the windshield 1. Part of the upper member 122 extends laterally over the decorative member 601 of the side molding part 6 to form a peak 123. In other words, the upper portion of the side fastener part 12 is in the shape of T. The under side of the upper member 122 is curved along the surface of the pillar panel 5, being in pressure contact with the pillar panel 5 to seal the space between the pillar panel 5 and the upper surface of the windshield 1. The peak 23 of the side fastener part 12 defines a U-shaped space together with the side molding part 6. This space is used as a water drain channel 13 to be described later.

The side molding part 6 includes a decorative portion 602 and a leg 601 extending from the decorative portion 602 identically to the upper molding part 4.

When inserted into the space 121c of the side fastener part 12, the ribbed side of the leg 601 is engaged with the ribbed surface of the bend 121b of the side fastener part 12.

At the side periphery of the window opening, the intermediate wall 5a of the pillar panel 5 extends upward to increase its height from the upper surface from the windshield 1. According to the increased height of the intermediate wall 5a, the wall 121a of the lower member 121 is also increased in height. As the wall 121a becomes higher, part of the upper member 122 extends laterally to form the peak 123 above the side molding part 6, defining a U-shaped space together with the wall 121b and the decorative member 602 of the side molding part 6. The U-shaped space is used as the water drain channel 13. One each of the water drain channel 13 is formed along each side edge of the windshield 1 to guide fluid such as rain water to a specified direction, preventing the fluid from spreading over side windows.

The positions of the upper members 901, 122 of the upper and side fastener parts 9, 12 are determined with reference to the lower members 901, 121. In other words, the positional relationships between these members are the same throughout the upper and side molding and fastener parts.

The upper member 122 and lower member 121 begin to change their shapes gradually near the upper end of the side fastener part 12 and keep on changing to the lower end of the side fastener part 12. Specifically, the lower member 121 gradually increases its height and part of the upper member 122 extends laterally above the side molding part 6 to from the peak 123.

The U-shaped space, defined by the peak 123, lower member 121 and the decorative member 602 of the side molding part 6, is changed its shape according to the lower member 121 and the peak 123. This space is used as the water drain channel 13.

A second embodiment of the invention will be described with reference to FIGS. 5 to 7. The members same as those of the first embodiment are assigned the same reference numerals.

Figure 5:
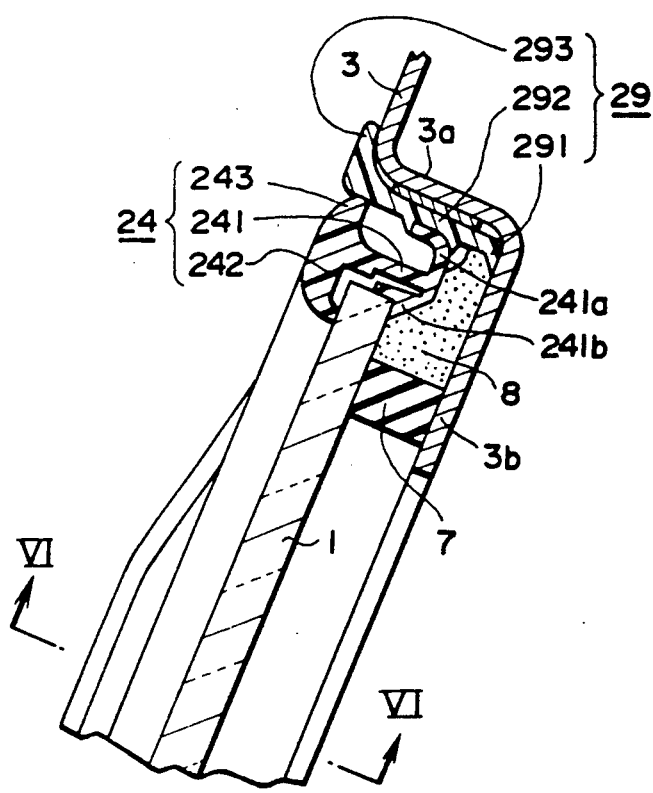
FIG. 5 is a cross-sectional view of a fastener according to a second embodiment of this invention, taken along line I—I of FIG. 4.

As shown in FIG. 5, there is a space between the upper edge of the windshield 1 and the intermediate wall 3a of the roof panel 3. An upper molding part 24 is installed in this space via an upper fastener part 29 Structures of the fastener part 29 and the molding part 24 will be described with reference to FIGS. 5 to 7.

The upper fastener part 29 includes an upper member 293, a lower member 292 and a base 291. The base 291 is shaped to be in contact with the flange 3b. The upper fastener part 29 is mounted on the flange 3b with the base 291 thereof positioned near the second bend of the intermediate wall 3a as the reference position. The lower member 292 has a flat surface confronting the intermediate wall 3a, and a ribbed surface (with two ribs). The lower member 292 supports the upper molding part 24 on the ribbed surface thereof. The lower member 292 is fastened to the intermediate wall 3a of the pillar panel 3 by a double adhesive tape 11.

The underside of the upper member 293 is curved according to the shape of the roof panel 3. The upper member 293 is in close contact with the surface of the roof panel 3, serving as an upper sealing member.

The upper molding part 24 includes decorative portions 242, 243, and a leg 241 extending from the decorative portions 242, 243.

The leg 241 terminates in feet 241a, 241b. The foot 241a extends from the end of the leg 241 toward the lower member 292 of the fastener 29, while the foot 241b extends toward the windshield 1. The foot 241a is bent toward the upper fastener part 29, being fitted in the two ribs on the lower member 292. The foot 241b is contacted with the lower corner edge of the windshield 1. Thus, the upper molding 24 is firmly supported by the upper fastener part 29 and the windshield 1.

The edge of the decorative portion 242 is in pressure contact with the upper surface of the windshield 1, serving as a lower sealing member between the windshield 1 and the roof panel 3.

The other decorative portion 243 is in contact with the upper molding part 29, sealing the space between the upper fastener part 29 and the upper molding part 24.

The molding has the same structure throughout the upper and side molding parts. A side fastener part differs from the upper fastener part in the following: The lower member of the side fastener part increases its height according to a varying difference of height between the upper surface of the windshield 1 and the pillar panel of the vehicle, and that the upper member extends laterally over the upper surface of the windshield 1 accordingly.

Figure 6:
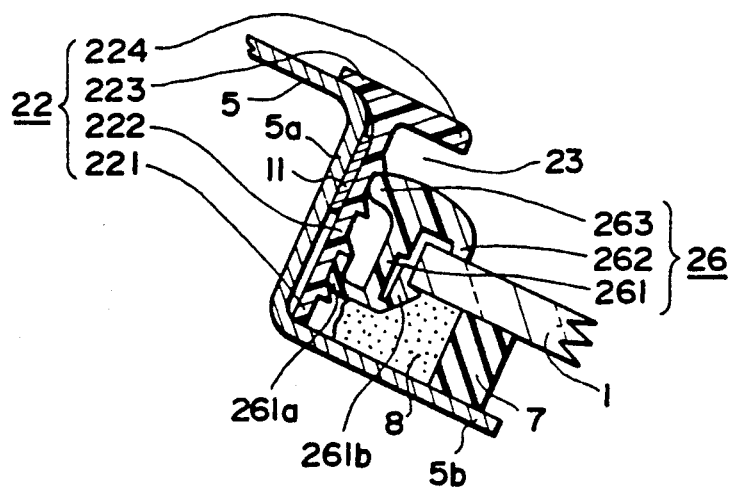
FIG. 6 is a view similar to FIG. 2.
Figure 7:
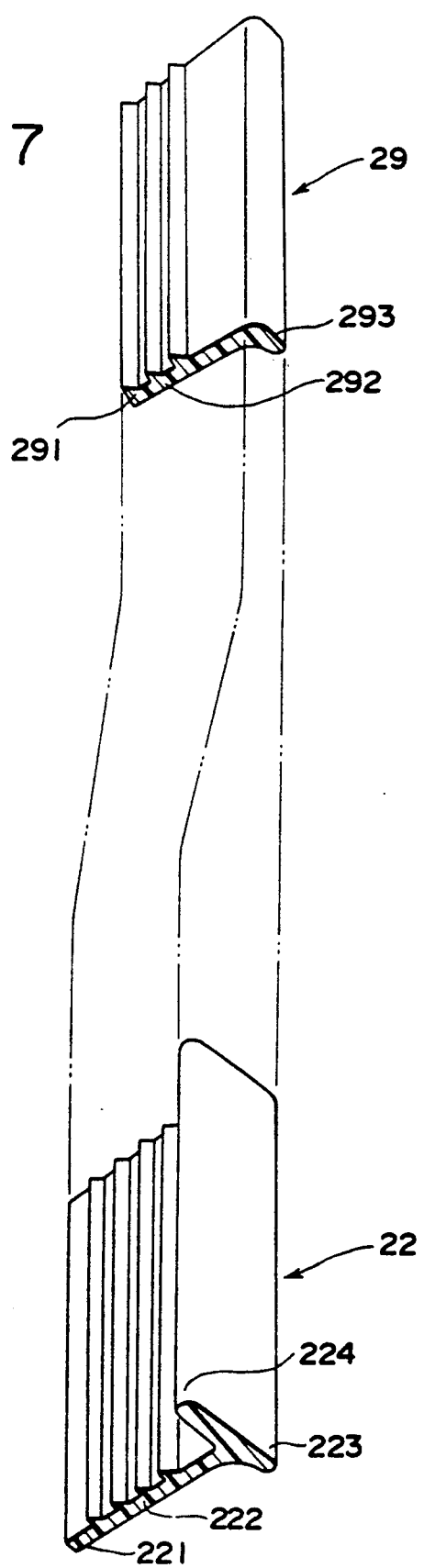
FIG. 7 is a view similar to FIG. 3.

As shown in FIG. 6, the lower member 222 of the side fastener part 22 increases its height. The number of ribs on a side of the lower member 222 is increased to 4. The decorative portion 263 and foot 261a of the side molding part 26 are engaged with these ribs. Specifically the decorative portion 263 is fitted between the upper two ribs, while the foot 261a is fitted between the lower two ribs.

The laterally extending portion of the upper member 223 serves as a peak 224, which defines a Ushaped space together with the lower member 222 and the side molding part 26. This U-shaped space serves as a water drain channel 23 to guide fluid such as rain water. The size of the water drain channel 23 depends upon the changing height and length of the lower member 222 and the peak 224.

The positional relationship between the side fastener part 22 and the side molding part 26 is essentially the same as that between the upper molding and fastener parts described above.

A molding machine for producing the fastener of the first embodiment will be described referring to FIG. 8.

Figure 8:
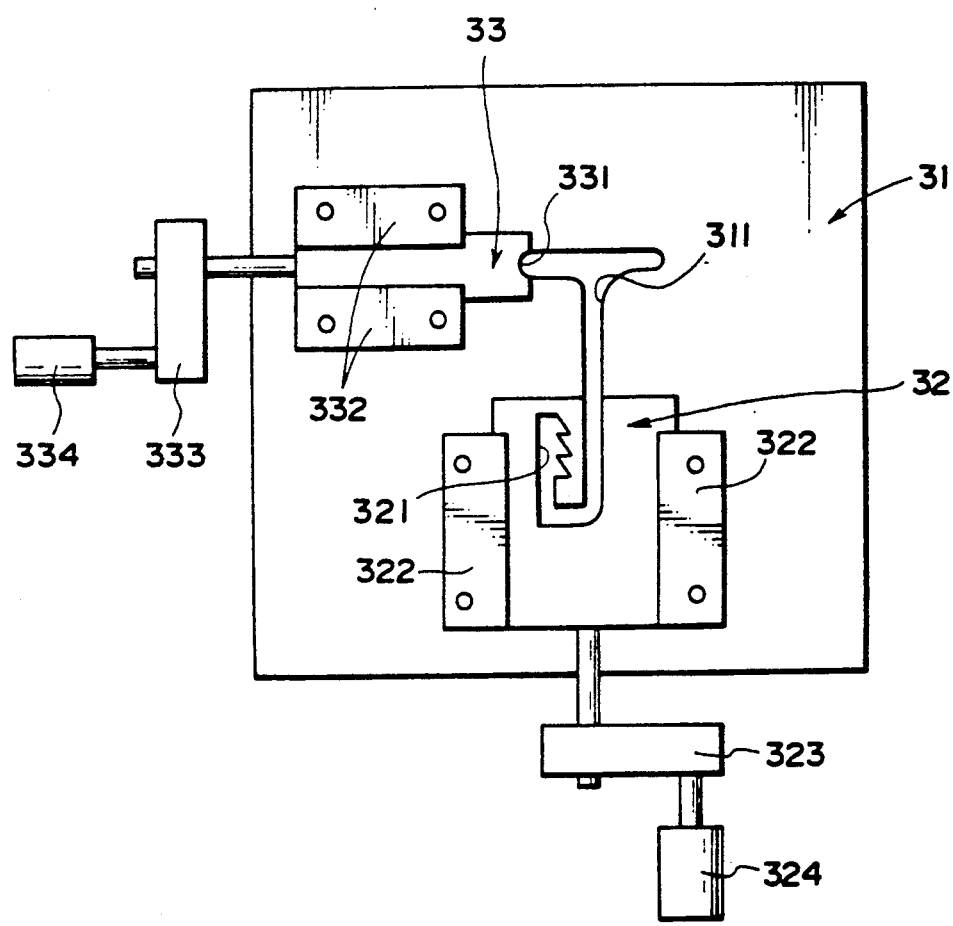
FIG. 8 is a front elevational view of a molding machine for manufacturing the fastener of FIG. 1.

The molding machine comprises first, second and third dies 31, 32, 33 positioned in the direction for extruding the fastener (in the direction perpendicular to the plane shown in FIG. 8). The first die 31 is stationary, and the second and third dies 32, 33 are positioned to be linearly movable on the first die 31. The first die 31 has an opening 311 corresponding to the cross-sectional shape of the fastener, i.e. of the lower member 901 (121) and upper member 902 (122) of the fastener part 9 (12). The second die 32 has an opening 321 corresponding to the cross-sectional shape of the ribbed bend 901b (121b) of the fastener (9, 12). The third die 33 has an opening 331 corresponding to the cross-sectional shape of the peak 123.

The second die 32 is supported by a pair of guides 322 to be vertically movable, being connected to an output shaft of a motor 324 via a converter 323. The third die 33 is supported by a pair of guides 332 to be horizontally movable, being connected to an output shaft of a motor 334 via a converter 333.

In operation, the motors 324, 334 are operated to adjust the positions of the second and third dies 32, 33 with the first die 31 so that the molding machine produces a fastener strip having the foregoing cross-sectional shape.

What is claimed is:

1. An extruded fastener strip for mounting a strip-like member to a body panel of a motor vehicle, comprising:
   (a) an upper member for selaing a space between the strip-like member and the body panel of the motor vehicle;
   (b) a lower member extending downwardly from said upper member, said lower member being folded at an end thereof to define a space for receiving the strip-like member therein; and
   (c) a peak extending laterally over the strip-like member to define a space for a water drain channel.

2. An extruded fastener strip according to claim 1, wherein said lower member has a gradually increased height in relation to the body panels.

3. An extruded fastener strip for mounting a windshield molding in a window opening of a vehicle body panel and a windshield, comprising a pair of side fastener parts and an upper fastener part integral with and extending between said side fastener parts, each of said upper fastener part and said side fastener parts including:
   (a) an upper member for sealing a space between the windshield molding and the body panel of the motor vehicle; and
   (b) lower member extending downwardly from said upper member, said lower member being folded at an end thereof to define a space for receiving the windshield molding therein, whereby said lower member of said side fastener part has a gradually increased height, and said upper member has a peak extending laterally therefrom to define a space for a water drain channel.

* * * * *